SUBSCRIPTION COLOR TELEVISION SYSTEM

Original Filed May 18, 1953

WALTER S. DRUZ
ERWIN M. ROSCHKE
INVENTORS.
BY Francis W. Crotty
THEIR ATTORNEY.

SUBSCRIPTION COLOR TELEVISION SYSTEM

Original Filed May 18, 1953 4 Sheets-Sheet 2

WALTER S. DRUZ
ERWIN M. ROSCHKE
*INVENTORS.*

BY Francis W. Crotty

THEIR ATTORNEY.

SUBSCRIPTION COLOR TELEVISION SYSTEM

Original Filed May 18, 1953 4 Sheets-Sheet 3

WALTER S. DRUZ
ERWIN M. ROSCHKE
*INVENTORS.*

BY Francis W. Crotty

THEIR ATTORNEY.

SUBSCRIPTION COLOR TELEVISION SYSTEM

Original Filed May 18, 1953 4 Sheets-Sheet 4

WALTER S. DRUZ
ERWIN M. ROSCHKE
*INVENTORS.*

BY Francis W. Carroll

THEIR ATTORNEY.

United States Patent Office

Re. 24,926
Reissued Jan. 17, 1961

24,926

SUBSCRIPTION COLOR TELEVISION SYSTEM

Walter S. Druz, Bensenville, and Erwin M. Roschke, Des Plaines, Ill., assignors to Zenith Radio Corporation, a corporation of Delaware Original No. 2,853,544, dated Sept. 23, 1958, Ser. No. 355,718, May 18, 1953. Application for reissue Feb. 13, 1959, Ser. No. 793,225

26 Claims. (Cl. 178—5.1)

Figure 1:
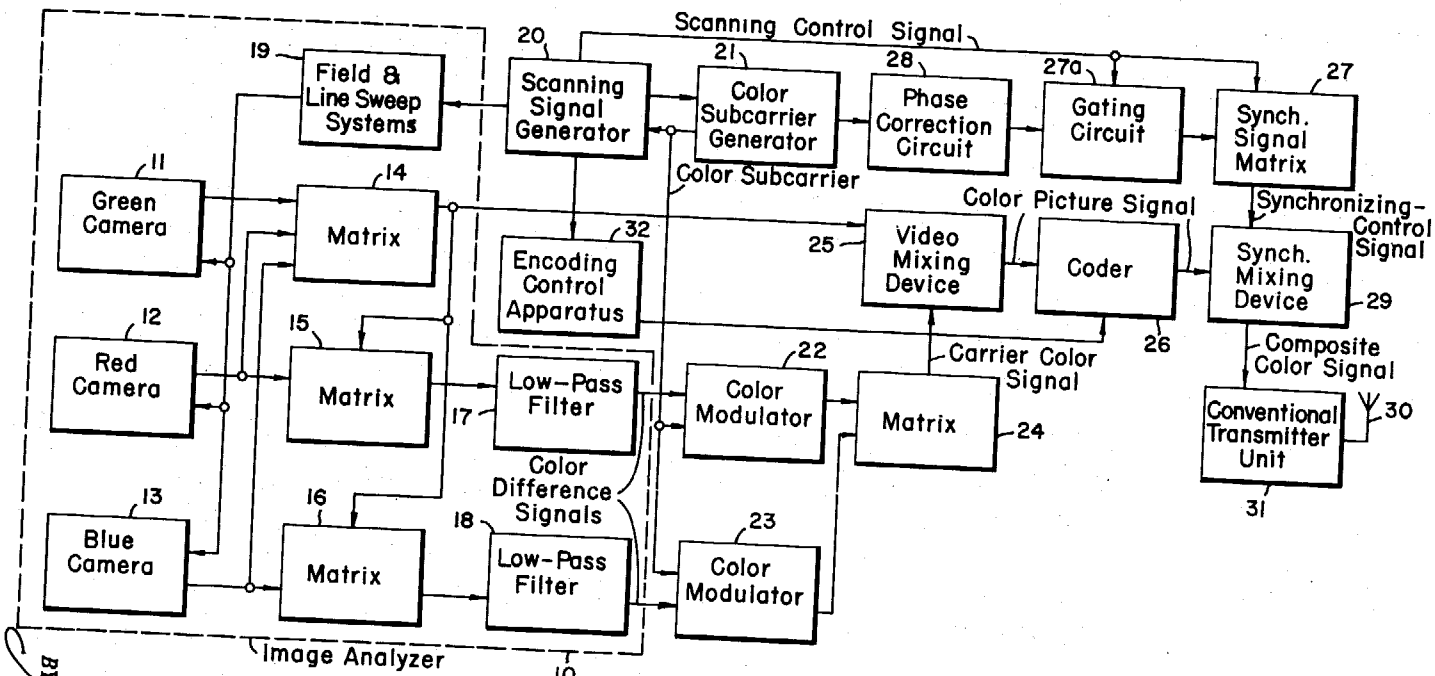

Matter enclosed in heavy brackets [ ] appears in the original patent but forms no part of this reissue specification; matter printed in italics indicates the additions made by reissue.

This invention pertains to new and improved subscription television systems and associated apparatus for use in the transmission and reproduction of images in simulated natural color. Although the invention is applicable to various types of color television systems, such as those employing dot-sequential or simultaneous color transmission, it is particularly advantageous when employed in connection with a color telecast of the general type currently proposed by the National Television System Committee, and will be described in that environment.

Since the invention may be practiced in either a transmitter or receiver, the term "encoding" is used herein in its generic sense to encompass either coding at the transmitter or decoding at the receiver.

In the color television system formulated by the National Television System Committee, commonly referred to as the NTSC system, components corresponding to the color and luminance information pertaining to a scanned image are segregated and transmitted as individual signals interleaved within a portion of the frequency spectrum. At the transmitter, three color-image signals representative of a scanned image are combined in a fixed ratio to form a luminance signal, sometimes referred to as a monochrome signal. At the same time, a plurality of color difference signals are developed, each individually corresponding to the amplitude difference between one of the color-image signals and a predetermined portion of the monochrome signal, that predetermined portion presently being established as the complete luminance signal. A system of this basic type is described in the copending application of John L. Rennick, Serial No. 215,761, filed March 15, 1951 and assigned to the same assignee as the present application. The color difference signals, which represent the hue and saturation values of the color components of the scanned image, are modulated in fixed phase relationship with a color subcarrier having a frequency equal to an odd integral multiple of one-half the line-scanning frequency to permit interleaving of the color and luminance information without creating undesirable interference between these two parts of the picture information. The ultimate transmission standards have not as yet been determined, but are still somewhat flexible. Nevertheless, it is generally considered that the luminance signal and the essential information representing only two of the color difference signals will be transmitted, since the third color difference signal may then be derived at the receiver; complete reconstruction of the color-image is made possible by the fixed mathematical relationship existing between the luminance signal and each of the color difference signals.

A relatively large number of methods have been proposed for encoding a television signal to preclude intelligible reproduction of the information contained in that signal by other than authorized receivers; an even greater number of types of apparatus have been formulated to perform the necessary coding functions at the transmitter and to provide adequate and accurate decoding at an authorized receiver. One of the most effective and efficient types of subscription television system includes apparatus for selectively delaying spaced time portions of the picture or video signal with respect to the scanning-control signal included in the composite television signal, or, alternatively, delaying selected portions of the scanning-control signal with respect to the picture signal. When this type of coding is applied, at the transmitter, to a standard monochrome television signal, it is possible to decode the signal at an authorized receiver by similarly delaying selected portions of the picture signal (or the scanning-control signal) which have been translated in unaltered condition by the transmitter. Accordingly, reconstruction of an intelligible image at the receiver may be effected by relatively simple decoding devices which do not place an undue economic burden upon the receiver manufacturer or owner.

When subscription encoding techniques of the general type described above are applied to a color television system such as that currently proposed by the National Television System Committee, however, several inherent difficulties are encountered. The problems presented in utilizing delay type encoding in a color television system are primarily due to the fact that the color information included in the NTSC type of color television signal is conveyed by both phase and amplitude modulation of the color subcarrier. Accordingly, in order to reconstruct the color information at a receiver, it is necessary to develop a color-carrier reference signal which not only has a fixed frequency relationship with respect to the color subcarrier, but also must have a predetermined fixed phase relationship with respect to the subcarrier. Indiscriminate delay of portions of the color picture signal with respect to the color synchronizing signal results in the formation of a composite color signal which is inconsistent in phase relationship with respect to the color subcarrier. When such a signal is decoded at a receiver in accordance with known techniques, the picture is usually reproduced in erroneous and distorted color combinations; the resulting visual effect is relatively unintelligible and aesthetically unsatisfactory.

It is an object of this information, therefore, to provide a subscription color television system which utilizes and retains the advantages of time-delay coding but which minimizes the above described inherent difficulties encountered when this type of coding is applied to color transmission.

It is a further object of the invention to provide a subscription color television system which facilitates accurate and intelligible decoding with respect to both color and image detail information at an authorized receiver.

It is a corollary object of this invention to provide a subscription color television system of the time-delay coding type which permits a wide latitude in the choice of coding control apparatus and which is not restricted to any particular means or method for transmitting decoding information to authorized receivers.

The video or color picture signal developed in a color television system necessarily includes considerably more information than is incorporated in a standard monochrome telecast. When the usual coding techniques are applied to color television, the effect on an unauthorized receiver is generally similar in many respects to the effects produced in a monochrome system. The requirement for the transmission of additional information may be put to advantageous use if a somewhat more complex encoding technique is employed; however, indiscriminate selection of transmitter coding methods and apparatus may easily lead to excessively stringent and economically infeasible receiver requirements.

Accordingly, it is an object of the invention to provide a subscription color television system in which greater security is obtained through the use of improved coding methods and apparatus.

It is an additional object of the invention to provide a subscription color television system which permits effective utilization of a wide variety of coding methods without imposing unduly stringent requirements upon the decoding apparatus of a receiver.

It is a further object of the invention to provide efficient and relatively economical transmitter and/or receiver apparatus for realizing all of the above-noted system objectives.

The National Television System Committee has proposed standard definitions for various descriptive terms applicable to the color television art (Electrical Engineering, December 1952, pages 1120–1122). Insofar as possible, the proposed standardized terminology is used throughout the specification and the appended claims; the more important terms are defined as follows:

Carrier color signal.—The sidebands of the modulated color subcarrier (plus the color subcarrier, if not suppressed) which are added to the luminance signal to convey color information.

Color burst.—A few cycles of color subcarrier frequency which are included in the composite color signal for synchronizing the color carrier reference. Also known as color sync signal.

Color carrier reference.—A continuous signal having the same frequency as the color subcarrier and having a predetermined fixed phase relationship with respect thereto.

Color difference signal.—A signal which, when added to the luminance signal, produces a signal representative of one of the tristimulus values of the transmitted color.

Color picture signal.—The electric signal which represents color picture information, comprising a monochrome component plus a subcarrier modulated with color information (the carrier color signal), but not including synchronizing signals.

Color subcarrier.—The carrier whose modulation sidebands are added to the monochrome signal to convey color information.

Composite color signal.—The signal representing the complete color picture including blanking and all synchronizing signals.

Luminance signal.—A signal wave which is intended to have exclusive control of luminance in the reproduced picture. Also known as monochrome signal.

Matrix.—A network, device, or circuit for additively combining two signals to derive a signal representative of their algebraic sum or difference. (This definition does not correspond to the standardized NTSC terminology.) Also known as matrix unit or matrix circuit.

In each of its several aspects, the subscription color television system of the invention comprises a transmitter which includes an image analyzer for scanning an image at a predetermined scanning repetition frequency to derive a luminance signal and a plurality of color difference signals. The transmitter further includes a color reference generator for developing a color subcarrier having a predetermined frequency.

In one particular aspect of the invention, a modulating system is coupled to the image analyzer and to the color reference generator; the modulating system modulates the color difference signals in predetermined phase relationship with the color subcarrier to develop a carrier color signal. A synchronizing system, which is coupled to the image analyzer and to the color reference generator, develops a synchronizing-control signal including information representative of the scanning repetition frequency and of the frequency and phase of the color subcarrier. A first mixing device is coupled to the image analyzer and to the modulating system to combine the luminance signal and the carrier color signal to form a color picture signal. An encoding apparatus, coupled to the first mixing device, selectively delays a preselected portion of the color picture signal, in accordance with a predetermined coding schedule and by a time delay interval substantially equal to an integral number of cycles of the color subcarrier, to develop a coded color picture signal. A second mixing device is included in the transmitter and is coupled to the encoding apparatus and to the synchronizing system to combine the coded color picture signal and the synchronizing-control signal to develop a coded composite color signal.

In accordance with another aspect of the invention, the modulating system is again coupled to the image analyzer and to the color reference generator of the transmitter and is employed to modulate the color difference signals in predetermined phase relationship with the color subcarrier to generate a carrier color signal. The modulating system, the image analyzer and the color reference generator are coupled to a first mixing device which combines the luminance signal, the carrier color signal, and selected portions of the color subcarrier to form an intermediate color picture signal including color synchronizing components. An encoding apparatus is coupled to the first mixing device to selectively delay a preselected portion of the intermediate color picture signal in accordance with a predetermined coding schedule to develop a coded intermediate color picture signal. The image analyzer and the color reference generator are coupled to a synchronizing system which generates a scanning-control signal representative of the scanning repetition frequency of the analyzer, and a second mixing device is coupled to the synchronizing system and to the encoding apparatus to combine this scanning-control signal with the coded intermediate color picture signal to develop a coded composite color signal.

According to a further aspect of the invention, the transmitter includes an image analyzer, a color reference generator, and a synchronizing system corresponding to those described above. An encoding system is coupled to the image analyzer and is employed to selectively delay a preselected portion of at least one of the color difference and luminance signals; this delay is effected in accordance with a predetermined coding schedule. A modulating system, coupled to the encoding system and to the color reference generator, modulates the color difference signals in predetermined phase relationship with the color subcarrier to develop a carrier color signal. The modulating system, the synchronizing system, and the encoding system are all coupled to a mixing device which combines the luminance signal, the carrier color signal, and the synchronizing-control signal to form a coded composite color signal.

In each of its several aspects, the color television transmitter of the subject subscription system includes means for radiating the coded composite color signal developed at the transmitter. Furthermore, in each of the system aspects, a receiver is provided to intercept the radiated coded composite color signal and to reproduce the scanned image in simulated natural color. A receiver suitable for use in the system comprises means for demodulating and decoding the radiated coded composite color signal to derive therefrom a plurality of control signals substantially corresponding to the luminance signal and the color difference signals as well as the synchronizing- or scanning-control signal.

Figure 2:
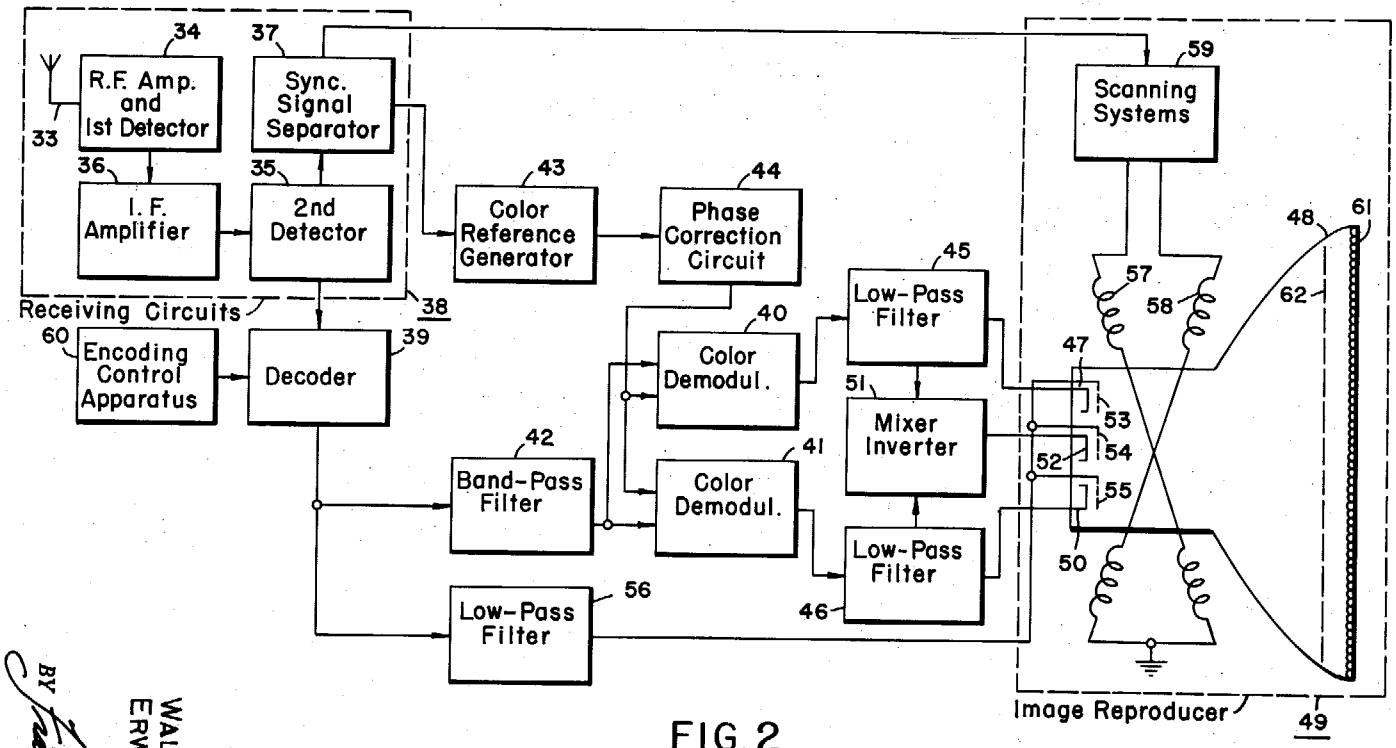
Figure 3:
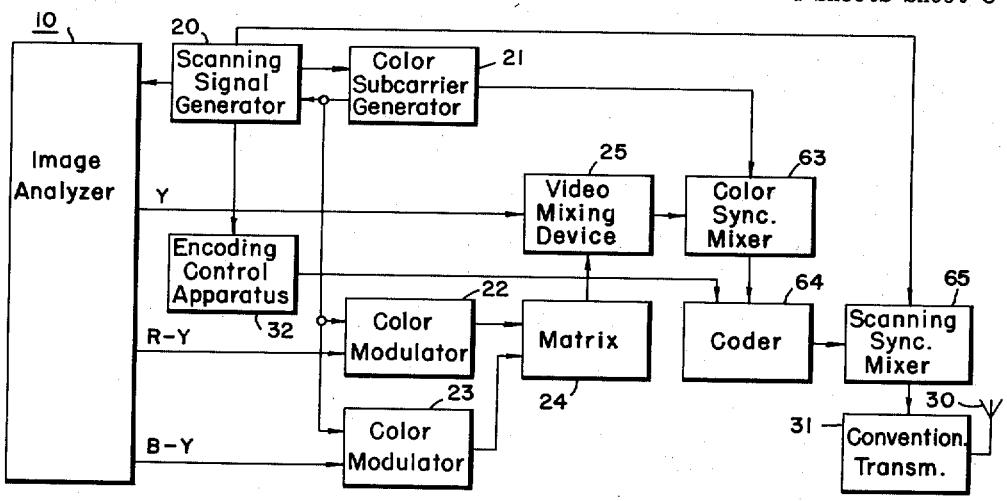
Figure 4:
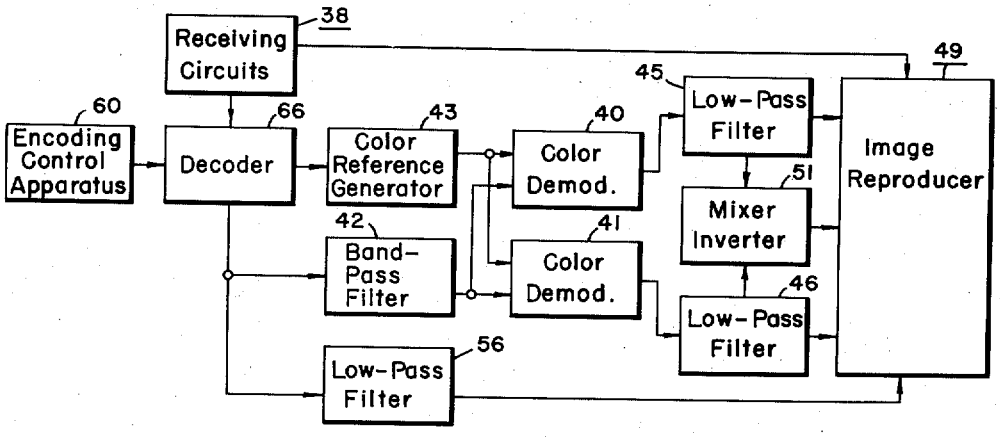
Figure 5:
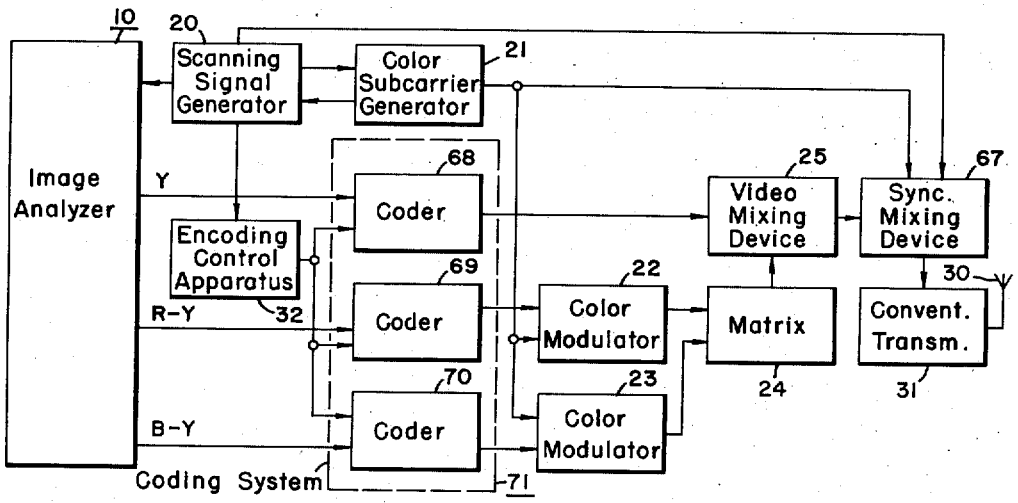
Figure 6:
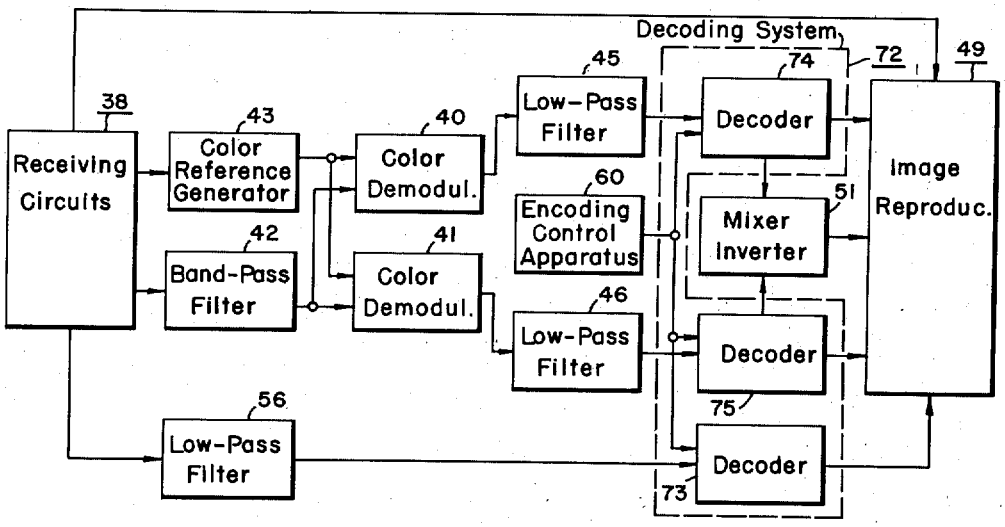

The features of the invention which are believed to be novel are set forth with particularity in the appended claims. The organization and manner of operation of the invention, together with further objects and advantages thereof, may best be understood by reference to the following description taken in conjunction with the accompanying drawings, in which:

Figure 1 is a schematic representation of a subscription color television transmitter constructed in accordance with one aspect of the invention;

Figure 2 schematically illustrates a subscription color television receiver adapted to cooperate with the transmitter of Figure 1 to form a complete subscription color television system;

Figure 3 is a schematic diagram of a subscription color television transmitter constructed in accordance wtih another aspect of the invention;

Figure 4 schematically illustrates a subscription color television receiver adapted to reproduce color television signals broadcast by the transmitter of Figure 3;

Figure 5 is a schematic view of a subscription color television transmitter according to an additional aspect of the invention; and Figure 6 schematically illustrates a subscription color television receiver for reproducing television signals radiated by the transmitter of Figure 5.

The transmitter of Figure 1 comprises an image analyzer 10 adapted to develop certain of the fundamental signals necessary for the transmission of color television images in accordance with the proposed tentative standards of the National Television System Committee. Image analyzer 10 comprises three color television cameras 11, 12 and 13, the output terminals of each of the cameras being connected to a matrix 14. The output of camera 12 is also coupled to another matrix 15 and camera 13 is similarly coupled to an additional matrix 16; matrices 15 and 16 are also coupled to the load terminals of matrix 14. A low-pass filter 17 is coupled to the load terminals of matrix 15 and a similar filter 18 is coupled to the output of matrix 16. Suitable field and line-sweep systems for cameras 11—13 are included in image analyzer 10 and are illustrated as unit 19, which is coupled to each of the cameras.

The field and line-sweep systems included in unit 19 of image analyzer 10 are coupled to a scanning-signal generator 20 which is also coup'ed to a color subcarrier generator 21. The output of generator 21 is connected in a feedback circuit to scanning-signal generator 20 and is also coupled to a pair of color modulators 22 and 23. Modulators 22 and 23 are coupled to the output stages of filters 17 and 18 of image analyzer 10. A matrix 24 is coupled between the output terminals of modulators 22 and 23 and a first mixer designated as video mixing device 25. Mixing device 25 is connected to the output terminals of matrix 14 of analyzer 10, and the load terminals of the mixing device are connected to a coder 26. Coder 26 is also coupled to the output stage of an encoding control apparatus 32 which is connected to scanning-signal generator 20.

In addition to the previously noted connections, the output of scanning-signal generator 20 is coupled to a synchronizing-signal matrix 27 and to a gating circuit 27a; matrix 27 is also coupled to the output stage of color subcarrier generator 21 through a phase correction circuit 28 and gating circuit 27a. The output terminals of both matrix 27 and coder 26 are connected to a second mixing device, synchronizing mixer 29, which is in turn coupled to an antenna 30 through a conventional transmitter unit 31 comprising suitable amplifier, carrier wave generator, and modulator circuits.

With the exception of encoding control apparatus 32, encoder 26 and phase correction circuit 28, all of the circuit units of the transmitter illustrated in Figure 1 are well known in the color television art; accordingly, a brief description of their operational characteristics will be adequate. When the transmitter is placed in operation, cameras 11—13 scan an image (not shown) to develop color-image signals which include information concerning the luminance and chrominance values of the image. In the usual system, these color-image signals are derived in terms of three additive primary colors, generally taken as green, red and blue. For the transmitter as shown, the green, red and blue image signals are developed by cameras 11, 12, and 13 respectively; these signals may be symbolized as G, R and B. If preferred, a single camera capable of developing a plurality of separate color-image signals corresponding to the luminance, hue, and saturation values of a scanned image may be used to replace cameras 11—13 without affecting operation of the system insofar as the inventive concept is concerned.

The three color-image signals developed by cameras 11—13 are applied to matrix 14, wherein they are combined in accordance with a predetermined fixed ratio to form a luminance or monochrome signal, usually designated as Y. The red and blue image signals R and B developed in cameras 12 and 13 are also app'ied to matrix units 15 and 16 respectively; in these matrices, the color-image signals are individually algebraically combined with the luminance signal Y to form two color difference signals conventionally expressed as R—Y and B—Y. One of the color difference signals, R—Y, is supplied from matrix 15 through low-pass filter 17 to color modulator 22. In modulator 22, the color difference signal is used to amplitude modulate one phase component of a color subcarrier of angular frequency w which is supplied to the modulator from color subcarrier generator 21. In similar fashion, color difference signal B—Y is translated through filter 18 and is modulated with another phase component of the subcarrier in modulator 23. The output signals from modulators 22 and 23, which in the usual system are of the form (R—Y) sin wt and (B—Y) cos wt respectively, are additively combined in matrix 24 to develop a carrier color signal having the general form (R—Y) sin wt+(B—Y) cos wt. Accordingly, modulators 22 and 23 and matrix 24 may be considered as constituting a modu'ating system for modulating the color difference signals developed in image analyzer 10 in predetermined phase relationship with the color subcarrier generated in unit 21 to develop a carrier color signal. The carrier color signal formed in matrix 24 and the monochome signal developed in matrix 14 are combined in video mixing device 25 to form a color picture signal including both luminance and color information; in the presently proposed NTSC system the color picture signal may be expressed by the general formula $E=Y+K[(R-Y) \sin wt+(B-Y) \cos wt]$, where E represents the color picture signal and K is a constant.

The line and field-scanning frequencies of the color cameras included in image analyzer 10 are controlled by scanning signals generated in unit 20 and applied to field and line-sweep systems 19. The scanning-control signal developed in generator 20 is also applied to color subcarrier generator 21 to control the subcarrier frequency, which in the NTSC system must be equal to an odd integral multiple of one-half the line-scanning frequency; the feedback connection from subcarrier generator 21 to scanning signal generator 20 is employed to lock the two generators in fixed frequency relation. Short bursts of the color subcarrier, sometimes referred to as the color sync signal, are supplied from gating circuit 27a to matrix 27, in which the color bursts are combined with the scanning-control signal developed by generator 20 to form a synchronizing-control signal including information representative of the scanning-repetition frequency of analyzer 10 as well as the frequency and phase of the color subcarrier. Matrix 27 and generator 20 thus constitute a synchronizing system for generating the synchronizing-control signal, which is applied to mixing device 29 and there combined with the color picture signal developed in first mixing device 25 to form a composite color signal. The composite color signal is then supp'ied to conventional transmitter unit 31, amplified and modulated on a suitable carrier, and applied to antenna 30 from which it is radiated.

The foregoing description of the operation of the transmitter of Figure 1 is entirely conventional and does not take into consideration the operational effects of coder 26, control apparatus 32, or phase correction circuit 28. Coder 26 comprises means for delaying preselected portions of the color picture signal developed in mixing device 25 with respect to other portions of the color picture signal, by a predetermined time delay interval. This encoding process is carried out in accordance with a predetermined coding schedule established by apparatus 32. In its simplest form, coder 26 may include alternate signal channels, one of which translates the color picture signal from mixing device 25 to mixer 29 with no effective time delay, whereas the other channel translates the color picture signal through a delay line or similar apparatus and imparts a predetermined delay to the signal. An encoding system of this type is described and claimed in the copending application of Robert Adler, Serial No. 243,039, filed August 22, 1951, issued August 7, 1956 at Patent No. 2,758,153, and assigned to the same assignee as this application. The simplest and most economical type of encoding, insofar as the apparatus required is concerned, comprises delaying randomly selected image fields; however, faster-than-field changes in the operating condition of coder 26 may be employed and, if further coding complexity is desired, the coder may include means for dividing the color picture signal on a frequency or amplitude basis and selectively coding portions of the components of the color picture signal following division. If coding is effected with respect to spaced time portions of the color picture signal, such as separate fields, the translation characteristics of coder 26 may be controlled by a suitable signal developed in apparatus 32 and synchronized with the field-retrace intervals of image analyzer 10 by means of the connection of apparatus 32 to scanning-signal generator 20. As indicated in the preliminary portions of this specification, the type of apparatus utilized in coder 26 to delay portions of the color picture signal, as well as the devices constituting control apparatus 32, are not critical with respect to the invention; specific examples of encoding systems suitable for this purpose are disclosed and claimed in Patent No. 2,547,598 to Erwin M. Roschke, issued April 3, 1951, and in the copending applications of George V. Morris et al., Serial No. 281,418, filed April 9, 1952, Jack E. Bridges, Serial No. 326,107, filed December 15, 1952, and issued February 11, 1958 as Patent No. 2,823,252, and Carl G. Eilers et al., Serial No. 291,714, filed June 4, 1952, all of which are assigned to the same assignee as this application. It should be noted that the coding schedules for some of these different kinds of encoding control apparatus are not inflexibly fixed, but are predetermined only in the sense that the means for establishing the coding schedule and the method of operation thereof are determined beforehand.

In order to understand the effects of the incorporation of the encoding apparatus comprising coder 26 and encoding control apparatus 32 upon the operation of a subscription television, it may be advantageous to consider first the structure and operation of a suitable receiver. The receiver schematically illustrated in Figure 2, which is adapted to reproduce a color telecast developed and radiated by the transmitter of Figure 1, comprises an antenna 33 connected to a radio-frequency amplifier and first detector 34. Unit 34 is in turn coupled to a second detector 35 through an intermediate-frequency amplifier 36; second detector 35 is connected to a synchronizing-signal separator 37. Units 33—37 may be of any of the conventional types well known in the art, and any similar group of receiving circuits capable of performing the same general functions may be employed; accordingly, these units are generally referred to hereinafter as a single unit designated receiving circuits 38. Second detector 35 is coupled to a decoder 39 which, in turn, is coupled through a band-pass filter 42 to the input terminals of a pair of color demodulators 40 and 41. An encoding control apparatus 60 is also coupled to decoder 39; the type of apparatus used for encoding control unit 60 will, of course, be dependent to a certain extent upon the construction of transmitter encoding control apparatus 32. Specific examples of receiver encoding control apparatus are disclosed and claimed in the patent to Erwin M. Roschke and in the applications of George V. Morris et al., Jack E. Bridges, and Carl G. Eilers et al. noted above; however, as with the transmitter encoding apparatus, the particular type of encoding system is not critical and any suitable apparatus may be employed without adversely affecting operation of the receiver.

A color reference generator 43 is connected to synchronizing-signal separator 37 of unit 38; the output of generator 43 is coupled to demodulators 40 and 41 through a phase correction circuit 44. The output stage of color demodulator 40 is coupled to a low-pass filter 45, whereas the load terminals of demodulator 41 are coupled to a similar low-pass filter 46. Low-pass filter 45 is coupled to one cathode 47 of a cathode-ray display device 48 incorporated in an image reproducer 49. Display device 48, here shown as including a tri-color luminescent screen 61, a shadow mask 62, and three separate electron guns, may comprise any of the many familiar types of color-image reproducers known in the art or any other type of color display device capable of resolving the signal information available in the NTSC system into an acceptable color image. The output terminals of filter 46 are coupled to a second cathode 50 included in device 48. A mixer-inverter 51 is coupled to filters 45 and 46 and the output terminals of inverter 51 are connected to a third cathode 52 of device 48. Display device 48 of image reproducer 49 includes three control electrodes 53, 54 and 55 individually respectively associated with cathodes 47, 52 and 50; control electrodes 53—55 are connected to each other and through a low-pass filter 56 to decoder 39. Image reproducer 49 further includes two pair of deflection coils 57 and 58 mounted in quadrature relation with respect to display device 48 and coupled to a scanning system unit 59; scanning unit 59 is also coupled to the output stage of synchronizing-signal separator 37 of receiving circuits 38.

When the receiver of Figure 2 is placed in operation, the coded composite color signal radiated from the transmitter of Figure 1 is intercepted by antenna 33 and applied to circuit 34. In unit 34, the received signal is amplified and heterodyned with a suitable locally developed oscillatory signal to derive an intermediate-frequency signal, which is supplied to second detector 35 after amplification in circuit 36. In device 35, the intermediate-frequency signal is detected and the coded composite color signal, substantially free of the radiation carrier, is developed; the coded composite color signal is applied to separator 37, which is utilized to separate the synchronizing-control signal representing scanning- and color-synchronizing information. As noted above, the structural, functional, and operational characteristics of the receiving circuit included in unit 38 are all well understood in the art, and a more specific and detailed description of these circuits is therefore deemed unnecessary.

The synchronizing-control signal derived from the composite color signal by separator 37 is applied to scanning systems 59 to control the repetition frequency of the scanning signals applied to deflection coils 57 and 58 of image reproducer 49 in well known fashion. At the same time, the color burst or color sync signal included in the synchronizing-control signal is applied to color reference generator 43 and is utilized therein to control the frequency and phase of a locally developed color carrier reference signal; a frequency-selective circuit may be utilized to couple separator 37 to generator 43 to preclude translation of the scanning-signal components to the color reference generator. For purposes to be made apparent hereinafter, it may be advantageous to consider the operation of the receiver for a condition in which phase correction circuit 44 is completely passive and translates the color-carrier reference signal unchanged so that the reference signal is directly applied to color demodulators 40 and 41, and in which decoder 39 and control apparatus 60 are ineffective so that the composite color signal developed by second detector 35 is applied directly to band-pass filter 42 and low-pass filter 56. It should be noted that the color picture signal, which represents the actual picture content as contrasted with synchronizing information, predominates in the composite color signal developed in detector 35; furthermore, the synchronizing signals occur only during retrace intervals in the composite color signal. Accordingly, the effective output from detector 35 is equivalent to the color picture signal insofar as the demodulating circuits and reproducer 49 are concerned, although the synchronizing-signal content may be separated from the composite color signal prior to utilization in the image-reproducing circuits if desired.

Under the foregoing assumptions, therefore, it is apparent that the receiver of Figure 2 operates as a well known type of color receiver, in which the carrier color signal included in the color picture signal derived from receiving circuits 38 is translated through band-pass filter 42 and applied to demodulators 40 and 41. In the demodulators, the carrier color signal is demodulated or detected to derive two color difference signals generally corresponding to the color difference signals utilized at the transmitter (usually R—Y and B—Y). The color difference signals are applied to filters 45 and 46, which are included in the receiver primarily to prevent the translation of the color-carrier reference signal to image reproducer 49. The color difference signals are then supplied to cathodes 47 and 50 of cathode-ray tube 48 to control the hue and saturation values of two of the primary colors in an image developed on luminescent screen 61 of device 49. At the same time, the two color difference signals are supplied from filters 45 and 46 to mixer-inverter 51, wherein they are suitably combined to form a third color difference signal, usually G—Y, which is then applied to cathode 52 to control the hue and saturation values of a third primary color in the image developed by reproducer 49. The luminance of the image generated on screen 61 of reproducer 49 is controlled by the signal applied to electrodes 53—55; this signal, after translation through low-pass filter 56, generally corresponds to the luminance signal included in the color picture signal derived from second detector 35. It should be noted that because of the particular subcarrier frequency used for the transmission of color information, the carrier color signal component of the color picture signal has very little effect upon the overall luminance of the picture even if it is translated directly from the second detector and applied to electrodes 53—55; accordingly, filter 56 may be omitted if desired.

As thus far described, the receiver of Figure 2 is entirely conventional in operation and does not, therefore, make any correction to compensate for the time delay encoding applied to the color picture signal by the transmitter of Figure 1. At an unauthorized receiver, for example, the reproduced image shifts in position each time a transition from an undelayed to a delayed portion of the coded composite color signal occurs, and the resultant "jitter" in the image makes for unsatisfactory and virtually intolerable viewing conditions. Consequently, it is necessary to utilize decoder 39 and encoding control apparatus 60 to modify the color picture signal developed in receiving circuits 38 to permit reconstruction of an intelligible image by reproducer 49. As indicated in the preliminary portions of this specification, the prior art techniques for subscription television decoding would seem to indicate that decoding may be accomplished by selectively delaying, in decoder 39, those portions of the color picture signal which were not delayed by coder 26 of the transmitter of Figure 1. However, in actual practice, this encoding procedure results in completely distorted color values in the image reproduced by device 48; the net effect on image reproducer 49 is to cause substantial color contamination, and the resulting color image, although not "jittered," is still quite unsatisfactory.

The color distortion which ordinarily results from the application of the usual type of time-delay subscription coding and decoding to a color television transmission may be obviated by providing means for controlling the phase relationship of the color reference signal developed by generator 43 and the color picture signal derived by detector 35; it is to this problem, among others, that the invention is directed. The usual encoding delay interval applied to preselected portions of the color picture signal by coder 26 is relatively long with respect to the time required for a single cycle of the color subcarrier. This relationship may be utilized to construct an operable color television system by restricting the delay introduced by coder 26 so that the coding interval is equal, within approximately five electrical degrees, to an integral number of cycles of the color subcarrier frequency. To complete the system, and to avoid any possible color ambiguities, it is necessary that decoder 39 delay those portions of the color picture signal which are translated in unaltered condition through coder 26 by a time interval which is also equal to an integral number of cycles of the color subcarrier and which is also accurate within five electrical degrees. If encoder 26 and decoder 39 are constructed to fulfill this requirement, phase correction circuits 28 and 44 of the transmitter (Figure 1) and the receiver (Figure 2) respectively are not required; this is due to the fact that color reference generator 43 and color subcarrier generator 21 both develop signals which have a constant phase relationship with respect to both the coded and uncoded portions of the carrier color signal included in the color picture signal. In other words, utilization of an encoding interval which is equal to an integral number of cycles of the color subcarrier does not disturb the phase relationship between the subcarrier and the carrier color signal.

The resulting subscription color television system may have two or more alternative modes of operation. Assuming, for simplicity, that only two modes A and B of operation are used, during mode A coder 26 delays the color picture signal at the transmitter by an integral number of subcarrier cycles; at the same time, in the receiver, decoder 39 translates the color picture signal derived by receiving circuits 38 in unmodified form. On the other hand, during mode B, coder 26 translates the color picture signal without any substantial delay, whereas decoder 39 delays the mode B portions of the color picture signal by a time interval equal to an integral number of cycles of the color-subcarrier and equal to the encoding interval employed at the transmitter in connection with mode A. Inasmuch as the delay intervals applied to the color picture signal by both the coder and the decoder do not alter the phase relationship of the carrier color signal with respect to the color subcarrier developed by generator 21 of Figure 1, no color distortion is introduced.

The subscription color television apparatus of Figures 1 and 2, as described in the preceding paragraph, provides a subscription color system which eliminates the color ambiguities which would normally be introduced by the coding and decoding apparatus comprising units 26 and 32 of the transmitter (Figure 1) and circuits 39 and 60 of the receiver (Figure 2). However, it is somewhat difficult to construct delay devices for use in coder 26 and decoder 39 which have the requisite bandwidth characteristics (approximately flat delay characteristic over a 4.5 megacycle band) and which are sufficiently accurate with respect to the encoding delay interval. These requirements are somewhat disadvantageous insofar as the receiver is concerned in that they tend to increase the cost of the receiver components. In one modification of the basic system comprising the apparatus of Figs. 1 and 2, phase correction circuit 28 is utilized at the transmitter to overcome this difficulty. Again assuming that only two operation modes C and D are employed, during mode C encoder 26 delays the color picture signal by an encoding time interval which is not necessarily equal to an integral number of subcarrier cycles; for this same period of operation, decoder 39 translates the color picture signal derived by the receiver without delay. During alternate operational mode D, the color picture signal is not delayed at transmitter coder 26 but is delayed by receiver decoder 39 by a time interval equal to that employed at the transmitter during mode C. In order to compensate for the color distortion which would normally result from this type of encoding delay, phase correction circuit 28 is utilized to continuously modify the phase of the color bursts supplied from generator 21 to matrix 27 with respect to the color picture signal so that the color bursts incorporated in the composite color signal correspond in phase to the delayed carrier color signal. This must be a continuous phase correction operation, since all of the color picture signal is delayed by an equal encoding interval, in either coder 26 or decoder 39, prior to demodulation and utilization in receiver image reproducer 49 (Figure 2); in other words, those portions of the color picture signal which are not delayed at the transmitter (with respect to the intervening color picture signal portions and the synchronizing-control signal) are delayed at the receiver, so that the entire color picture signal is changed in its time relationship to the color sync signal component of the synchronizing-control signal.

A more specific example of the structure and operation of phase correction circuit 28 may be of assistance in determining its effect upon the performance of the system of Figures 1 and 2. For example, coder 26 may delay the color picture signal, during mode C operating intervals, by an encoding time interval equal to 5¼ cycles of the subcarrier; to decode the transmitted signal, receiver decoder 39 delays the mode D portions of the color picture signal by an equal amount. Consequently, the carrier color signal applied to demodulators 40 and 41 of Figure 2 is not correctly phased with respect to the color subcarrier developed in generator 21 of Figure 1, but is ninety degrees out of phase with respect thereto. For this specific arrangement, phase correction circuit 28 may constitute a non-reflective delay line which delays the color sync signal by a time interval equal to the encoding interval, 5¼ cycles, to restore the correct phase relationship. An equally effective system may be constructed by utilizing a much shorter delay time in circuit 28, since a delay or phase shift of only ¼ cycle in circuit 28 also restores the requisite phase relation between the color sync signal components and the color information applied to the demodulators.

Phase correction need not necessarily be applied at the transmitter; an analogous system may be constructed by incorporation of phase correction circuit 44 in the receiver of Figure 2. For this embodiment, presuming two alternative operative modes E and F, coder 26 delays the color picture signal for a predetermined encoding interval (which need not be equal to an integral number of color subcarrier cycles) during operational mode E, and, during that same mode, receiver decoder 39 translates the color picture signal without delay. Conversely, the mode F portions of the composite picture signal are translated in unmodified form through coder 26 and are delayed by receiver decoder 39. Correction of the color values in the reproduced image is achieved by phase correction circuit 44, which continuously modifies the phase relationship between the color carrier reference signal developed in generator 43 and the received carrier color signal applied to demodulators 40 and 41. Phase correction circuit 44 is essentially similar to circuit 28 (Figure 1) and may comprise time-delay circuits or any other suitable type of phase-shifting network; it will be apparent to those skilled in the art that a preferred system embodiment may include phase correction units in both the transmitter and the receiver if further security or more flexible color correction facilities are desired.

A somewhat different aspect of the invention is presented in the subscription color television system comprising the transmitter of Figure 3 and the receiver of Figure 4. The transmitter illustrated in Figure 3 comprises an image analyzer 10; as in Figure 1, the image analyzer is coupled to two color modulators 22 and 23 and to a video mixing device 25. Analyzer 10 is further coupled to the output terminals of a scanning-signal generator 20, and the scanning-signal generator output is also coupled to a color subcarrier generator 21 and to an encoding control apparatus 32. As in the transmitter of Figure 1, subcarrier generator 21 has a feedback connection to scanning-signal generator 20 and an output coupling to modulators 22 and 23. The load terminals of modulators 22 and 23 are coupled through a matrix 24 to mixing device 25.

In this transmitter, however, the output terminals of first mixing device 25 are coupled to a color sync mixer 63, and the output of color subcarrier 21 is also connected to mixer 63. A coder 64, generally similar to coder 26 of Figure 1, is coupled to color sync mixer 63 and to encoding control apparatus 32; the load terminals of coder 64 are connected to a scanning sync mixer 65. Scanning sync mixer 65 is also coupled to the output stage of scanning-signal generator 20, and the load terminals of the mixer are coupled to an antenna 30 through a conventional transmitter unit 31, the latter two devices generally corresponding to the similar units included in the transmitter of Figure 1.

The receiver of Figure 4 is in most respects essentially similar to that of Figure 2. As in the previously-described embodiment, conventional receiving circuits 38 are included in the receiver and are coupled to an image reproducer 49. In this embodiment, however, the remainder of the receiver stages are coupled to receiving circuits 38 through a decoder 66. As before, two color demodulators 40 and 41 are provided and are each coupled to the output stages of a color reference generator 43 and to a band-pass filter 42; the load terminals of the demodulators are coupled to image reproducer 49 through a pair of low-pass filters 45 and 46 and a mixer-inverter 51 in the same manner as in the embodiment of Figure 2. Image reproducer 49 is connected to the decoder through a low-pass filter 56, and an encoding control apparatus 60 is provided for decoder 66. It will be observed that the principal significant change made with respect to the receiver of Figure 2 comprises the connection of color reference generator 43 to decoder 66 rather than directly to receiving circuits 38.

Except for their coding and decoding functions, the transmitter of Figure 3 and the receiver of Figure 4 operate in a manner analogous to the corresponding apparatus of Figures 1 and 2; accordingly, the description of the normal operation of the individual apparatus units need not be repeated in detail. As before, matrix 24 of the transmitter of Figure 3 combines the two carrier-modulated color difference signals developed in modulators 22 and 23 to develop a carrier color signal; this carrier color signal is supplied to video mixing device 25 and is combined therein with the luminance signal developed in image analyzer 10 to form a color picture signal which includes complete picture information but does not comprise any synchronizing signal components. The color picture signal is then applied to color sync mixer 63, wherein it is combined with bursts of the color subcarrier frequency (the color sync signal) to form an intermediate color picture signal which includes color synchronizing information but does not comprise a scanning-control signal. If preferred, video mixing device 25 and color sync mixer 63 may comprise a single mixing network or matrix for combining the luminance signal, the carrier color signal, and the color sync signal. The intermediate color picture signal developed in mixers 25 and 63 is applied to coder 64, which delays preselected portions of the intermediate color picture signal with respect to other portions thereof by a predetermined encoding interval; as before, the coding is carried out in accordance with a schedule determined by encoding control apparatus 32. The coded intermediate color picture signal formed in device 64 is applied to scanning sync mixer 65, wherein it is combined with the scanning-control signal generated by device 20 to form a coded composite color signal. As in the embodiment of Figure 1, the coded composite color signal is then supplied to and radiated by antenna 30, carrier generation, modulation, and additional amplification being provided by translation through transmitter unit 31.

The signal radiated by antenna 30 of the transmitter of Figure 3 is intercepted by receiving circuit 38 of the receiver of Figure 4. The scanning-control signal is separated from the received telecast and is applied to image reproducer 49 to control the line- and field-scanning frequencies of the reproducer. At the same time, the coded composite color signal is applied to decoder 66, in which preselected portions are selectively delayed by a predetermined time interval substantially equal to the encoding time delay interval imparted to other portions by coder 64 of the transmitter. As before, decoding is controlled by apparatus 60. If desired, the scanning-signal information may be separated from the received composite color signal before it is applied to decoder 66, so that in effect only the coded intermediate color picture signal is translated through the decoder; however, this additional step is not essential since the superfluous information occurs during only retrace intervals and usually has no significant effect upon the image developed by reproducer 49. The decoded color picture signal developed in decoder 66 is applied to color demodulators 40 and 41, wherein the color difference signals are obtained by synchronous detection of the carrier color signal information translated by filter 42 with respect to the color reference signal developed in generator 43. The color difference signals are translated to image-reproducer 49 through filters 45 and 46; an additional color difference signal is formed in mixer-inverter 51 and is also supplied to the image reproducer. The luminance control elements of reproducer 49 are supplied with the color picture signal translated from decoder 66 through low-pass filter 56.

In order to simplify the explanation of the coding and decoding functions performed in the apparatus of Figures 3 and 4, it will be assumed that coder 64 and decoder 66 each have only two modes of operation G and H. In mode G, coder 64 of the transmitter of Figure 3 delays the intermediate color picture signal by a predetermined coding interval, whereas for the same operational mode the intermediate color picture signal is translated without substantial modification through receiver decoder 66. The intermediate color picture signal portions occurring during mode H operation are not delayed at the transmitter; however, the intermediate color picture signal derived by receiving circuits 38 during mode H operation is delayed in decoder 66 by a time interval equal to the encoding time-delay interval applied at the transmitter during mode G. Because the time delay in this system is always equally applied to the color sync signal and to the carrier color signal included in the color picture signal, the phase relationship between these two signals is not disturbed, and, accordingly, no color distortion or ambiguity is introduced into the system.

In each of the embodiments of the invention described above, the principal problem presented is the effect of time-delay encoding upon the phase relationship between the color subcarrier and the color carrier signal included in the color picture signal. To the observer, the net effect of each of these systems is to provide an apparent physical distortion or "jitter" in the image developed by an unauthorized receiver and, in some embodiments, to distort the color values in the image. In the system embodied in Figures 5 and 6, on the other hand, the additional complexity of the signals developed in a color television system, as compared with a monochrome system, are utilized to provide additional security by coding the color information in a manner which more effectively precludes decoding and reconstruction of the image by an unauthorized receiver.

The transmitter illustrated in Figure 5 is in most respects similar to that of Figures 1 and 3; it includes an image analyzer 10 which is coupled to a scanning-signal generator 20, to a video mixing device 25, and to a pair of color modulators 22 and 23. A color subcarrier generator 21 is included in the transmitter and is suitably interconnected with scanning-signal generator 20, the output of color subcarrier generator 21 also being coupled to modulators 22 and 23. The output stages of modulators 22 and 23 are again coupled to mixing device 25 through a matrix 24, and the load terminals of device 25 are suitably coupled to a second mixing device, sync mixer 67. Mixing device 67 is further connected to scanning-signal generator 20 and to color subcarrier generator 21, and the output stage of device 67 is coupled through a conventional transmitter unit 31 to an antenna 30.

It will be recognized that the transmitter, as thus far described, is essentially similar to the previously diccussed embodiments. The transmitter of Figure 5, however, comprises three individual coders 68, 69 and 70 included in a coding system 71. Coder 68 is coupled between image analyzer 10 and video mixer 25, whereas coders 69 and 70 are interposed between the image analyzer and color modulators 22 and 23 respectively. As in the embodiments of Figures 1 and 3, the coders are coupled to an encoding control apparatus 32 connected to scanning-signal generator 20.

The receiver illustrated in Figure 6 is essentially similar to the previously-described apparatus of Figures 2 and 4 and includes receiving circuits 38 coupled to an image reproducer 49, to a color reference generator 43, and to two color demodulators 40 and 41 through a band-pass filter 42. A suitable connection is provided between color reference generator 43 and the two color demodulators. The output stages of demodulators 40 and 41 are individually coupled to image reproducer 49 through low-pass filters 45 and 46 respectively, and a further connection between the color demodulators and the image reproducer is provided through mixed-inverter 51. Receiving circuits 38 are also coupled to image reproducer 49 through a low-pass filter 56.

The principal difference between the receiver of Figure 6 and those of Figures 2 and 4 resides in the incorporation of a decoding system 72 in the receiver. Decoding system 72 comprises a first decoder 73 which is interposed in the luminance channel of the receiver between low-pass filter 56 and image reproducer 49. System 72 further includes a pair of decoders 74 and 75 which are incorporated in the chrominance channel of the receiver, decoder 74 being coupled between low-pass filter 45 and image reproducer 49 and decoder 75 being similarly interposed between filter 46 and reproducer 49. Furthermore, the coupling connections between filters 45 and 46 and mixer-inverter 51 are made through decoders 74 and 75. As before, an encoding control apparatus 60 is included in the receiver and is coupled to decoders 73—75.

The structure and operation of the basic color television circuits of the apparatus of Figures 5 and 6 are essentially similar to the corresponding units in Figures 1–4; consequently, a detailed description of the operation of those units need not be repeated here. It should be noted that the principal modification made in the system of Figures 5 and 6, as compared to the previously described embodiments, comprises the incorporation of coding and decoding apparatus in the separated chrominance and luminance channels of the transmitter and receiver so that the color difference and luminance signals, instead of the color picture signal, are coded at the transmitter and decoded at the receiver.

In order to simplify and clarify the explanation of the operation of the system comprising the apparatus of Figures 5 and 6, it will be assumed that coders 68—70 and decoders 73—75 each comprise a pair of alternative signal translating channels, one of the translation channels in each encoder being adapted to impart a predetermined coding or decoding time-delay interval to a translated signal. For the simplest type of encoding with this apparatus, coders 68—70 delay the luminance and color difference signals developed in image analyzer 10, during a first operating mode J, by a fixed coding interval; in the receiver of Figure 6, during mode J, the color difference signals translated through filters 45 and 46 and the luminance signal translated through filter 56 are not delayed, but are applied to image reproducer 49 without substantial modification. For the alternative operational mode K, the luminance and color difference signals derived in analyzer 10 of the transmitter are translated in undelayed condition through coding system 71, whereas this same portion of each of the color difference and luminance signals is delayed by decoders 73—75 for a time interval substantially equal to that applied at the transmitter of Figure 5 during mode J. Thus, coding system 71 selectively delays preselected portions of each of the luminance and color difference signals in accordance with a predetermined coding schedule controlled by encoding apparatus 32; in the usual case, the encoded portions comprise spaced time portions such as separate picture fields. The receiver decoding system 72, on the other hand, selectively delays preselected portions of each of the luminance and color difference signals by an equal time interval in order to reconstruct color difference and luminance signals in which all portions of the signals have a constant time relationship.

If the embodiment illustrated in Figures 5 and 6 is operated in the manner described immediately above, the net effect on an unauthorized receiver is approximately the same as the coding effects described in relation to the apparatus of Figures 1–4, due to the fact that the luminance and color difference signals are coded and decoded in identical manner. However, the system of Figures 5 and 6 offers considerably greater flexibility with respect to encoding procedures, so that much greater security for the subscription system may be obtained. For example, a further operational mode L may be employed in which coders 69 and 70 of transmitter coding system 71 delay selected portions of the color difference signals but in which coder 68 translates the luminance signal from analyzer 10 to mixing device 25 without delay; during mode L operation, decoder 73 delays the luminance signal applied to image reproducer 49, whereas the remainder of decoding system 72 is conditioned to translate the color difference signals to image reproducer 49 without substantial delay. A further alternative operational procedure, which may be designated as mode M, may be effected by utilizing coder 68 to delay the monochrome signal in the transmitter of Figure 5 while translating the color difference signals from analyzer 10 to modulators 22 and 23 through coding system 71 without substantial modification. For mode M operation, receiver decoding system 72 selectively delays the color difference signals supplied by demodulators 40 and 41 through filters 45 and 46 by a time interval equal to that employed at the transmitter in coding the luminance information. Even if the units comprising coding system 71 and decoding system 72 have only two basic operating conditions, it is possible to obtain a considerably larger number of encoding and decoding conditions, as evidenced by the above-noted operational modes J, K, L, and M. Furthermore, this type of encoding is much more effective from a security standpoint, inasmuch as the color values of a picture developed by an unauthorized receiver are made to vary in a complex and confusing manner and, in modes L and M, the color images are reproduced in positions which are displaced from their corresponding luminance images on the screen of reproducer 49. Because all time delays are effected prior to modulation of the color difference signals with the color subcarrier or subsequent to their demodulation in the receiver, encoding systems 71 and 72 do not alter the phase relationship between the color subcarrier and the color carrier signal included in the color picture signal; consequently, no color ambiguities are introduced and there are no stringent requirements with respect to the time-delay interval utilized for coding. Although a greater number of coding and decoding units are employed, decoders 74 and 75 and coders 69 and 70 are required to translate only the color difference signals, which, in the NTSC system, are essentially low-definition signals requiring a bandwidth of only approximately one megacycle. This reduced bandwidth requirement makes it possible to use considerably less expensive delay devices for the added coding and decoding devices and serves to minimize the attendant cost increase. It will be understood, of course, that decoding system 72 may include a decoder interposed between mixer-inverter 51 and image reproducer 49 if it is desired to couple the mixer-inverter directly to low-pass filters 45 and 46.

In each of the systems described above, it is necessary to provide some means for making available at subscriber receivers the coding schedule developed in encoding apparatus 32 of each of the transmitters (Figures 1, 3 and 5) to encoding control apparatus 60 of the receivers (Figures 2, 4 and 6). A wide variety of means for accomplishing this result are described in the prior art subscription television systems, including separate telephone links, punched-card coding schedules, and means for transmitting a coded decoding signal in conjunction with the composite television signal. Inasmuch as virtually any of the known decoding information distribution arrangements may be employed in the color subscription television system of the invention, no encoding information link has been illustrated.

Although the subscription color television system disclosed herein all utilize time-delay encoding, they do not result in color contamination in the reproduced image, since each embodiment of the invention includes specific means for maintaining or re-establishing the necessary phase relationship between the color subcarrier and the color carrier signal. In addition the systems of the invention permit utilization of any desired type of coding schedule without disturbing the color values in the reproduced image. On the other hand, the encoding systems of the invention provide for greater security with respect to unauthorized interception of a subscription color telecast by introducing intermittent color contamination, displaced color images (color "ghosts") and other effects into images reproduced by ordinary color receivers.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. A subscription color television system comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a synchronizing system, coupled to said image analyzer and to said color reference generator, for generating a synsentative of said scanning repetition frequency and of the frequency and phase of said color subcarrier; a first mixing device, coupled to said image analyzer and to said modulating system, for combining said luminance signal and said carrier color signal to form a color picture signal; an encoding apparatus, coupled to said first mixing device, for relaying preselected portions of said color picture signal with respect to other portions thereof, in accordance with a predetermined coding schedule, by a time-delay interval substantially equal to an integral number of cycles of said color subcarrier to develop a coded color picture signal; a second mixing device, coupled to said encoding apparatus and to said synchronizing system, for combining said coded color picture signal and said synchronizing-control signal to form a coded composite color signal; means coupled to said second mixing device for radiating said coded composite color signal; and a receiver for intercepting said radiated coded composite color signal and reproducing said image in simulated natural color, said receiver comprising means for demodulating and decoding said radiated coded composite color signal to derive therefrom a plurality of control signals substantially corresponding to said luminance signal, said color difference signals, and said synchronizing-control signal.

2. A subscription color television transmitter comprising: an image analyzer for scanning an image at a predetermined scanning repetition frequency to derive a luminance signal and a plurality of color difference signals; a color reference generator for developing a color subcarrier having a predetermined frequency, a modulating system, coupled to said image analyzer and to said color reference generator, for modulating said color difference signals in predetermined phase relationship with said color subcarrier to develop a carrier color signal; a synchronizing system, coupled to said image analyzer and to said color reference generator, for generating a synchronizing-control signal including information representative of said scanning repetition frequency and of the frequency and phase of said color subcarrier; a mixing device, coupled to said image analyzer and to said modulating system, for combining said luminance signal and said carrier color signal to form a color picture signal; and an encoding apparatus, coupled to said mixing device, for delaying preselected portions of said color picture signal with respect to other portions thereof, in accordance with a predetermined coding schedule, by a time-delay interval substantially equal to an integral number of cycles of said color subcarrier to develop a coded color picture signal.

3. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a synchronizing system, coupled to said image analyzer and to said color reference generator, for generating a synchronizing-control signal including information representative of said scanning repetition frequency and of the frequency and phase of said color subcarrier; a first mixing device, coupled to said image analyzer and to said modulating system, for combining said luminance signal and said carrier color signal to form a color picture signal; an encoding apparatus, coupled to said first mixing device, for delaying a preselected portion of said color picture signal with respect to another portion thereof, in accordance with a predetermined coding schedule, by a time-delay interval substantially equal to an integral number of cycles of said color subcarrier to develop a coded color picture signal; and a second mixing device, coupled to said encoding apparatus and to said synchronizing system, for combining said coded color picture signal and said synchronizing-control signal to form a coded composite color signal.

4. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a synchronizing system, counted to said image analyzer and to said color reference generator, for generating a synchronizing-control signal including information representative of said scanning repetition frequency and of the frequency and phase of said color subcarrier; a mixing device, coupled to said image analyzer and to said modulating system, for combining said luminance signal and said carrier color signal to form a color picture signal; and an encoding apparatus, coupled to said mixing device, for selectively delaying preselected spaced time portions of said color picture signal with respect to intervening spaced time portions thereof, in accordance with a predetremined coding schedule, by a time-delay interval substantially equal to an integral number of cycles of said color subcarrier to develop a coded color picture signal.

5. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a synchronizing system, coupled to said image analyzer and to said color reference generator, for generating a synchronizing-control signal including information representative of said scanning repetition frequency and of the frequency and phase of said color subcarrier; a first mixing device, coupled to said image analyzer and to said modulating system, for combining said luminance signal and said carrier color signal to form a color picture signal; a coder, coupled to said mixing device, for developing a coded color picture signal, said coder being actuatable from a first operating condition, in which a first portion of said color picture signal is translated in a predetermined phase relationship with respect to said synchronizing-control signal, to a second operating condition, in which a second portion of said color picture signal is delayed and translated in a substantially altered phase relationship with respect to said synchronizing-control signal; means for selectively actuating said coder between said first and second operating conditions in accordance with a predetermined coding schedule; and a phase correction device for continuously modifying said synchronizing-control signal to re-establish said normal phase relationship between said synchronizing-control signal and said second portion of said color picture signal and to disrupt said phase relationship between said synchronizing-control signal and said first portion of said color picture signal.

6. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a synchronizing system, coupled to said image analyzer and to said color reference generator, for generating a synchronizing-control signal including a first component representative of said scanning repetition frequency and a second component representative of the frequency and phase of said color subcarrier; a first mixing device, coupled to said image analyzer and to said modulating system, for combining said luminance signal and said carrier color signal to form a color picture signal; a coder, coupled to said mixing device, for developing a coded color picture signal, said coder being actuatable from a first operating condition, in which a first portion of said color picture signal is translated in a predetermined normal phase relationship with respect to said second component of said synchronizing-control signal, to a second operating condition, in which a second portion of said color picture signal is delayed and translated in a substantially altered phase relationship with respect to said second component of said synchronizing-control signal; means for selectively actuating said coder between said first and second operating conditions in accordance with a predetermined coding schedule; and a phase correction device, included in said synchronizing system, for continuously modifying said synchronizing-control signal to re-establish said normal phase relationship between said second component of said synchronizing-control signal and said second portion of said color picture signal and to disrupt said phase relationship between said second component of said synchronizing-control signal and said first portion of said color picture signal.

7. A subscription color television receiver for utilizing a coded composite color signal comprising a coded color picture signal, including portions delayed with respect to other portions by a preselected coding interval equal to a predetermined integral number of cycles of a color subcarrier signal and in accordance with a predetermined coding schedule, and further comprising a synchronizing-control signal having a scanning signal component and a color subcarrier component, said receiver comprising: receiving circuits for deriving said coded color picture signal and said synchronizing-control signal from said coded composite color signal; a color reference generator, coupled to said receiving circuits, for developing a color-carrier reference signal having a frequency equal to the frequency of said color subcarrier and further having a predetermined fixed phase relationship with respect to said color subcarrier; a decoder, coupled to said receiving circuits, for delaying said other portions of said coded color picture signal by a time interval equal to a predetermined integral number of cycles of said color subcarrier to derive a decoded color picture signal; a color demodulating system, coupled to said color reference generator and to said decoder, for utilizing said color-carrier reference signal and a selected portion of said decoded color picture signal to develop a plurality of color difference signals; and an image reproducer, coupled to said decoder, to said color demodulating system, and to said receiving circuits, for utilizing said decoded color picture signal, said color difference signals, and said synchronizing-control signal to reproduce an image in simulated natural color.

8. A subscription color television receiver for utilizing a coded composite color signal comprising a synchronizing-control signal having a scanning frequency component and a color subcarrier component of predetermined phase and frequency, and further comprising a coded color picture signal including a first portion having a predetermined normal phase relationship with respect to said synchronizing-control signal and a second portion delayed by a preselected coding interval and having a substantially altered phase relationship with respect to said synchronizing-control signal, said receiver comprising: receiving circuits for deriving said coded color picture signal and said synchronizing-control signal from said coded composite color signal; a color reference generator, coupled to said receiving circuits, for developing a color-carrier reference signal having a frequency equal to the frequency of said color subcarrier and further having a predetermined fixed phase relationship with respect to said color subcarrier; phase-correction means, coupled to said color reference generator, for continuously modifying said color-carrier reference signal to establish a phase relationship between said color-carrier reference signal and said second portion of said color picture signal corresponding to said normal phase relationship between said synchronizing-control signal and said first portion of said color picture signal; a decoder, coupled to said receiving circuits, for delaying said first portion of said coded color picture signal with respect to said second portion by a time interval equal to said preselected coding interval to derive a decoded color picture signal; a color demodulating system, coupled to said phase correction means and to said decoder, for utilizing said modified color-carrier reference signal and a selected portion of said decoded color picture signal to develop a plurality of color difference signals; and an image reproducer, coupled to said decoder, to said color demodulating system and to said receiving circuits, for utilizing said decoded color picture signal, said color difference signals, and said synchronizing-control signal to reproduce an image in simulated natural color.

9. A subscription color television system comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a first mixing device, coupled to said image analyzer, to said color reference generator, and to said modulating system, for combining said luminance signal, said carrier color signal, and selected portions of said color subcarrier to form an intermediate color picture signal including color-synchronizing components; an encoding apparatus, coupled to said first mixing device, for delaying preselected portions of said intermediate color picture signal with respect to other portions thereof, in accordance with a predetermined coding schedule, to develop a coded intermediate color picture signal; a synchronizing system, coupled to said image analyzer and to said color reference generator, for generating a scanning-control signal representative of said scanning repetition frequency; a second mixing device, coupled to said encoding apparatus and to said synchronizing system, for combining said coded intermediate color picture signal and said scanning-control signal to form a coded composite color signal; means coupled to said second mixing device for radiating said coded composite color signal; and a receiver for intercepting said radiated coded composite color signal and reproducing said image in simulated natural color, said receiver comprising means for demodulating and decoding said radiated coded composite color signal to derive therefrom a plurality of control signals substantially corresponding to said luminance signal, said color difference signals, and said scanning-control signal.

10. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a mixing device, coupled to said image analyzer, to said color reference generator, and to said modulating system, for combining said luminance signal, said carrier color signal, and selected portions of said color subcarrier to form an intermediate color picture signal including color-synchronizing components; an encoding apparatus, coupled to said mixing device, for delaying preselected portions of said intermediate color picture signal with respect to other portions thereof, in accordance with a predetermined coding schedule, to develop a coded intermediate color picture signal; a synchronizing system, coupled to said image analyzer and to said color reference generator, for generating a scanning-control signal representative of said scanning repetition frequency; and means coupled to said encoding apparatus and to said synchronizing system for concurrently transmitting said coded intermediate color picture signal and said scanning-control signal.

11. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a modulating system, coupled to said image analyzer and to said color reference generator, for modulating said color difference signals in predetermined phase relationship with said color subcarrier to develop a carrier color signal; a first mixing device, coupled to said image analyzer, to said color reference generator, and to said modulating system, for combining said luminance signal, said carrier color signal, and selected portions of said color subcarrier to form an intermediate color picture signal including color-synchronizing components; an encoding apparatus, coupled to said first mixing device, for delaying preselected spaced time portions of said intermediate color picture signal with respect to intervening spaced time portions, in accordance with a predetermined coding schedule, to develop a coded intermediate color picture signal; a synchronizing system, coupled to said image analyzer and to said color reference generator, for generating a scanning-control signal representative of said scanning repetition frequency; a second mixing device, coupled to said encoding apparatus and to said synchronizing system, for combining said coded intermediate color picture signal and said scanning-control signal to form a coded composite color signal; and means coupled to said second mixing device for radiating said coded composite color signal.

12. A subscription color television receiver for utilizing a coded composite color signal comprising a scanning-control signal and a coded intermediate color picture signal including a color picture signal and a color subcarrier, predetermined portions of said coded intermediate color picture signal having been delayed, with respect to other portions thereof, by a preselected coding interval and in accordance with a predetermined coding schedule, said receiver comprising: receiving circuits for deriving said coded intermediate color picture signal, said color subcarrier, and said scanning-control signal from said coded composite color signal; a decoder, coupled to said receiving circuits, for effectively delaying said other portions of said coded intermediate color picture signal by a time interval equal to said preselected coding interval to derive a decoded intermediate color picture signal; a color demodulating system, coupled to said receiving circuits and to said decoder, for utilizing a selected portion of said decoded intermediate color picture signal and said color subcarrier to develop a plurality of color difference signals; and an image reproducer, coupled to said decoder, to said color demodulating system and to said receiving circuits, for utilizing said decoded color picture signal, said color difference signals, and said scanning-control signal to reproduce an image in simulated natural color.

13. A subscription color television receiver for utilizing a coded composite color signal comprising a scanning-control signal and a coded intermediate color picture signal including a color picture signal and bursts of a color subcarrier, predetermined portions of said coded intermediate color picture having been delayed, with respect to other portions thereof, by a preselected coding interval in accordance with a predetermined coding schedule, said receiver comprising: receiving circuits for deriving said coded intermediate color picture signal and said scanning-control signal from said coded composite color signal; a decoder, coupled to said receiving circuits, for effectively delaying said other portions of said coded intermediate color picture signal by a time interval equal to said preselected coding interval to derive a decoded intermediate color picture signal; a color reference generator, coupled to said decoder, for developing a color carrier reference signal having a frequency equal to the frequency of said color subcarrier and further having a predetermined fixed phase relationship with respect to said color subcarrier; a color demodulating system, coupled to said color reference generator and to said decoder, for utilizing said color-carrier reference signal and a selected portion of said decoded intermediate color picture signal to develop a plurality of color difference signals; and an image reproducer, coupled to said decoder, to said color demodulating system and to said receiving circuits, for utilizing said decoded color picture signal, said color difference signals, and said scanning-control signal to reproduce an image in simulated natural color.

14. A subscription color television system comprising: an image analyzer for scanning an image at a predetermined scanning repetition frequency to derive a plurality of image signals comprising a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding system, coupled to said image analyzer, for delaying preselected portions of at least one of said image signals with respect to other portions thereof in accordance with a predetermined coding schedule; a modulating system, coupled to said decoding system and to said color reference generator, for modulating said color difference signals in predetermined phase relationship with said color subcarrier to develop a carrier color signal; a matrix, coupled to said encoding system, to said modulating system, and to said synchronizing system, for combining said luminance signal, said carrier color signal, and said synchronizing-control signal to form a coded composite color signal; means coupled to said matrix for radiating said coded composite color signal; and a receiver for intercepting said radiated coded composite color signal and reproducing said image in simulated natural color, said receiver comprising means for demodulating and decoding said radiated coded composite color signal to derive therefrom a plurality of control signals substantially corresponding to said luminance signal, said color difference signals, and said synchronizing-control signal.

15. A subscription color television system comprising: an image analyzer for scanning an image at a predetermined scanning repetition frequency to derive a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding apparatus, coupled to said image analyzer, for delaying preselected portions of said luminance signal, with respect to other portions thereof, in accordance with a predetermined coding schedule to derive a coded luminance signal; a modulating system, coupled to said image analyzer and to said color reference generator, for modulating said color difference signals in predetermined phase relationship with said color subcarrier to develop a carrier color signal; a first mixing device, coupled to said encoding apparatus and to said modulating system, for combining said coded luminance signal and said carrier color signal to form a coded color picture signal; a second mixing device, coupled to said first mixing device and to said synchronizing system, for combining said coded color picture signal and said synchronizing-control signal to form a coded composite color signal; means coupled to said second mixing device for radiating said coded composite color signal; and a receiver for intercepting said radiated coded composite color signal and reproducing said image in essentially natural color, said receiver comprising means for demodulating and decoding said radiated coded composite color signal to derive therefrom a plurality of control signals substantially corresponding to said luminance signal, said color-difference signals, and said synchronizing-control signal.

16. A subscription color television transmitter comprising: an image analyzer for scanning an image at a predetermined scanning repetition frequency to derive a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding apparatus, coupled to said image analyzer, for delaying preselected portions of said luminance signal, with respect to other portions thereof, in accordance with a predetermined coding schedule to derive a coded luminance signal; a modulating system, coupled to said image analyzer and to said color reference generator, for modulating said color difference signals in predetermined phase relationship with said color subcarrier to develop a carrier color signal; and means coupled to said encoding apparatus and to said modulating system for concurrently transmitting said coded luminance signal and said carrier color signal.

17. A subscription color television transmitter comprising: an image analyzer for scanning an image at a predetermined scanning repetition frequency to derive a plurality of image signals including a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding system, coupled to said image analyzer, for delaying predetermined portions of at least one of said image signals with respect to other portions thereof in accordance with a predetermined coding schedule; a modulating system, coupled to said encoding system and to said color reference generator, for modulating said color difference signals in predetermined phase relationship with said color subcarrier to develop a carrier color signal; and means coupled to said encoding system and to said modulating system for concurrently transmitting said coded luminance signal and said carrier color signal.

18. A subscription color television transmitter comprising an image analyzer for scanning an image at a predetermined scanning repetition frequency to derive a plurality of image signals including a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding system, coupled to said image analyzer, for delaying preselected portions of at least one of said color difference signals with respect to other portions thereof in accordance with a predetermined coding schedule to derive a coded color difference signal; a modulating system, coupled to said image analyzer and to said color reference generator, for modulating said color difference signals in predetermined phase relationship with said color subcarrier to develop a coded carrier color signal; and a matrix, coupled to said encoding system, to said modulating system, and to said synchronizing system, for combining said luminance signal, said coded carrier color signal, and said synchronizing-control signal to form a coded composite color signal.

19. A subscription color television transmitter comprising: an image analyzer for scanning an image at a predetermined scanning repetition frequency to derive a plurality of image signals including a luminance signal and a plurality of color difference signals; a color reference generator for developing a color subcarrier having a predetermined frequency; a synchronizing system, coupled to said image analyzer and to said color reference generator, for generating a synchronizing-control signal including information representative of said scanning repetition frequency and of the frequency and phase of said color subcarrier; an encoding system, coupled to said image analyzer, for delaying preselected portions of each of said image signals with respect to other portions thereof in accordance with a predetermined coding schedule to form a coded luminance signal and a plurality of coded color difference signals; a modulating system, coupled to said encoding system and to said color reference generator, for modulating said coded color difference signals in predetermined phase relationship with said color subcarrier to develop a coded carrier color signal; and means coupled to said encoding system and to said modulating system for concurrently transmitting said coded luminance signal and said coded carrier color signal.

20. A subscription color television receiver for utilizing a coded composite color signal comprising a synchronizing-control signal, having scanning-control signal components and color subcarrier components, and further comprising a coded color picture signal which includes a luminance signal and a plurality of color difference signals, portions of at least one of said color difference and luminance signals having been delayed with respect to other portions thereof by a preselected coding interval in accordance with a predetermined coding schedule, said receiver comprising: receiving circuits for deriving said coded color picture signal, said scanning-control signal, said luminance signal, and said color subcarrier from said coded composite color signal; a color demodulating system, coupled to said receiving circuits, for utilizing said color subcarrier and a selected portion of said coded color picture signal to derive said plurality of color difference signals; a decoding system, coupled to said receiving circuits and to said color demodulating system, for effectively delaying portions of at least one of said color-difference and luminance signals with respect to other portions thereof by a time interval substantially equal to said preselected coding interval; and an image reproducer, coupled to said decoding system, to said color demodulating system and to said receiving circuits, for utilizing said luminance signal, said color difference signals, and said scanning-control signal to reproduce an image in simulated natural color.

21. A subscription color television receiver for utilizing a coded composite color signal comprising a synchronizing-control signal having scanning-control signal components and color subcarrier components and further comprising a coded color picture signal which includes a luminance signal and a plurality of color difference signals, portions of each of said color difference and luminance signals having been individually delayed with respect to other portions thereof by a preselected coding interval in accordance with a predetermined coding schedule, said receive comprising: receiving circuits for deriving said coded color picture signal, said scanning-control signal, said luminance signal, and said color subcarrier from said coded composite color signal; a color demodulating system, coupled to said receiving circuits, for utilizing said color subcarrier and a selected portion of said coded color picture signal to derive said plurality of color difference signals; a decoding system, coupled to said receiving circuits and to said color demodulating system, for individually delaying said other portions of each of said color difference and luminance signals by a time interval substantially equal to said preselected coding interval to develop a plurality of decoded color difference signals and a decoded luminance signal; and an image reproducer, coupled to said color demodulating system and to said receiving circuits, for utilizing said decoded luminance signal, said decoded color difference signals, and said scanning-control signal to reproduce an image in simulated natural color.

22. A subscription color television receiver for utilizing a coded composite color signal comprising a synchronizing-control signal having scanning-control signal components and color subcarrier components and further comprising a coded color picture signal which includes a luminance signal and a plurality of color difference signals, portions of said luminance signal having been delayed with respect to other portions thereof by a preselected coding interval in accordance with a predetermined coding schedule, said receiver comprising: receiving circuits for deriving said coded color picture signal, said scanning-control signal, said luminance signal, and said color subcarrier from said coded composite color signal; a color demodulating system, coupled to said receiving circuits, for utilizing said color subcarrier and a selected portions of said coded color picture signal to derive said plurality of color difference signals; a decoding system, coupled to said receiving circuits and to said color demodulating system, for selectively delaying said other portions of said luminance signal by a time interval substantially equal to said preselected coding interval and for continuously delaying each of said color difference signals by a time interval substantially equal to said preselected coding interval; and an image reproducer, coupled to said decoding system, to said color demodulating system and to said receiving circuits, for utilizing said luminance signal, said color difference signals, and said scanning-control signal to reproduce an image in simulated natural color.

23. A subscription color television receiver for utilizing a coded composite color signal comprising a synchronizing-control signal having scanning-control signal components and color subcarrier components and further comprising a coded color picture signal which includes a luminance signal and a plurality of color difference signals, portions of at least one of said color, difference and luminance signals having been delayed with respect to other portions thereof by a preselected coding interval in accordance with a predetermined coding schedule, said receiver comprising: receiving circuits for deriving said coded color picture signal, said synchronizing-control signal, and said luminance signal from said coded composite color signal; a color reference generator, coupled to said receiver circuits, for developing a color-carrier reference signal having a frequency equal to the frequency of said color subcarrier and further having a predetermined fixed phase relationship with respect to said color subcarrier; a color demodulating system, coupled to said receiving circuits and to said color reference generator, for utilizing said color-carrier reference signal and a selected portion of said coded color picture signal to derive said plurality of color difference signals; a decoding system, coupled to said receiving circuits and to said color demodulating system, for selectively delaying portions of at least one of said color-difference and luminance signals with respect to other portions thereof by a time interval substantially equal to said preselected coding interval; and an image reproduced, coupled to said color demodulating system and to said receiving circuits, for utilizing said luminance signal, said color difference signals, and said synchronizing control signal to reproduce an image in simulated natural color.

24. A subscription color television receiver for utilizing a coded composite color signal comprising a synchronizing-control signal having scanning-control signal components and color subcarrier components and further comprising a coded color picture signal which includes a luminance signal and a plurality of color difference signals, portions of each of said color difference and luminance signals having been individually delayed with respect to other portions thereof by a preselected coding interval in accordance with a predetermined coding schedule, said receiver comprising: receiving circuits for deriving said coded color picture signal, said synchronizing-control signal, and said luminance signal from said coded composite color signal; a color reference generator, coupled to said receiver circuits, for developing a color-carrier reference signal having a frequency equal to the frequency of said color subcarrier and further having a predetermined fixed phase relationship with respect to said color subcarrier; a color demodulating system coupled to said receiving circuits, and to said color reference generator, for utilizing said color-carrier reference signal and a selected portion of said coded color picture signal to derive said plurality of color difference signals; a decoding system, coupled to said receiving circuits and to said color demodulating system, for individually delaying portions of each of said color difference and luminance signals with respect to other portions thereof by a time interval substantially equal to said preselected coding interval to develop a plurality of decoded color difference signals and a decoded luminance signal; and an image reproducer, coupled to said color demodulating system and to said receiving circuits, for utilizing said decoded luminance signal, said decoded color difference signals, and said synchronizing-control signal to reproduce an image in simulated natural color.

*25. In a subscription color television receiver for receiving, demodulating and transducing a coded color television signal into a visible image having entertainment value, said coded television signal comprising a scanning synchronizing control representation and a plurality of discrete image defining components including, a color carrier component phase and amplitude modulated by chrominance information, a chrominance demodulation synchronizing signal component for controlling synchronous demodulation of said chrominance component in said receiver, and a luminance signal component representing monochrome brightness information, said television signal having been coded by imposing changing electrical delay on at least predetermined portions of at least one of said components with respect to at least one other portion of any of said components, said changing delay being in accordance with a secret coding schedule, the combination of: means for separating said scanning synchronizing control representation from said image defining components and said image defining components from each other upon reception by said receiver of a color television signal of the type described; means operatively coupled with said separating means and respon-*

*sive to said chrominance demodulation synchronizing signal for developing a chrominance demodulation signal; means operatively coupled with said separating means and said demodulation signal developing means responsive to image defining components and developed chrominance demodulation signal for producing demodulated color signals; means operatively coupled with said demodulated color signal producing means and said separating means for producing a visible color image; means producing a decoding control signal representing the character of said secret coding schedule; and controllable signal delay means operatively coupled with said last named means and said separating means and responsive to said decoding control signal for imposing changeable electrical delay on those portions of said signal components required to re-establish phase coincidence between portions of said components affected by said secret coding schedule, whereby a predetermined phase relationship between said scanning synchronizing component and all image defining components are represented in said visible color image.*

*26. In a subscriber color television receiving system for receiving, demodulating and decoding a standard color television signal which has been coded in accordance with a secrecy schedule, the standard television signal being represented by a first and a second multiplexed group of regularly interlaced signal frequencies, said first group representing luminance and scanning information while said second group represents chrominance and color demodulation synchronizing information, said coding being effectuated by imposing a changing electrical delay upon selected components of said second group of signal frequencies in accordance with said schedule, to produce color distortion in the color television information represented by said color television signal, the combination of: means for receiving a coded television signal of the type described; frequency selective means coupled with said receiving means for separating the signal information represented by said first and second groups of signal frequencies; signal responsive controllable delay means operatively connected with said receiving means for delaying selected components of those signals falling in said second group with respect to other components falling in said second group; a source of decoding signal depicting the character of said secrecy schedule; and means operatively coupling said decoding signal to said signal delay means for actuating said delay means in a manner complementary to said coding secrecy schedule whereby the phase relation of all components in the received coded color television signals are corrected to eliminate said color distortion.*

References Cited in the file of this patent or the original patent

UNITED STATES PATENTS

| | | |
|---|---|---|
| 2,390,250 | Hansell | Dec. 4, 1945 |
| 2,517,808 | Sziklai | Aug. 8, 1950 |
| 2,539,556 | Steinberg | Jan. 30, 1951 |
| 2,570,188 | Aram et al. | Oct. 9, 1951 |
| 2,656,409 | Morris et al. | Oct. 20, 1953 |
| 2,656,411 | Morris et al. | Oct. 20, 1953 |
| 2,664,460 | Roschke | Dec. 29, 1953 |
| 2,716,151 | Smith | Aug. 23, 1955 |